US009090046B2

(12) United States Patent
Sun et al.

(10) Patent No.: US 9,090,046 B2
(45) Date of Patent: Jul. 28, 2015

(54) CERAMIC COATED ARTICLE AND PROCESS FOR APPLYING CERAMIC COATING (71) Applicant: Applied Materials, Inc., Santa Clara, CA (US)

(72) Inventors: Jennifer Y. Sun, Mountain View, CA (US); Biraja P. Kanungo, San Jose, CA (US); Ren-Guan Duan, Fremont, CA (US); Sumit Agarwal, San Jose, CA (US); Dmitry Lubomirsky, Cupertino, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 13/747,292

(22) Filed: Jan. 22, 2013

(65) Prior Publication Data

US 2013/0273327 A1 Oct. 17, 2013

Related U.S. Application Data (60) Provisional application No. 61/624,937, filed on Apr. 16, 2012.

(51) Int. Cl.
*B32B 18/00* (2006.01)
*C04B 41/50* (2006.01)
(Continued)

(52) U.S. Cl.
CPC ............ *B32B 18/00* (2013.01); *C04B 41/009* (2013.01); *C04B 41/5045* (2013.01); *C04B 41/87* (2013.01); *C04B 41/4545* (2013.01); *Y10T 428/24562* (2015.01)

(58) Field of Classification Search
CPC .... B21B 18/00; C04B 41/5045; C04B 41/87; C04B 41/4545

USPC ......... 501/152, 134, 103, 105, 119, 126, 127, 501/88, 91, 92; 427/446, 453, 248.1, 331, 427/292, 355, 448, 560, 569, 58, 596, 135, 427/226, 255.28, 256, 272, 314, 352, 353, 427/376.1, 376.2, 376.7, 376.8, 402, 421.2, 427/422, 427, 595
See application file for complete search history.

(56) References Cited

U.S. PATENT DOCUMENTS 3,796,182 A 3/1974 Rosler
4,399,199 A 8/1983 McGill
(Continued)

FOREIGN PATENT DOCUMENTS

DE 03/01654 6/2003
EP 0330196 B1 8/1989
(Continued)

OTHER PUBLICATIONS

Tania Bhatia et al., "Mechanisms of ceramic coating deposition in solution-precurosr plasma spray," J.Mater. Res., vol. 17, No. 9, Sep. 2002, 10 pages, Materials Research Society, Warrendale, PA, USA.
(Continued)

*Primary Examiner* — Aaron Austin
*Assistant Examiner* — Jasper Saberi
(74) *Attorney, Agent, or Firm* — Lowenstein Sandler LLP (57) ABSTRACT To manufacture a ceramic article, a ceramic body comprising $Al_2O_3$ is roughened to a roughness of approximately 140 micro-inches (µin) to 240 µin. The ceramic body is subsequently cleaned and then coated with a ceramic coating. The ceramic coating comprises a compound of $Y_4Al_2O_9$ (YAM) and a solid solution of $Y_2\text{-}xZr_xO_3$. The ceramic coating is then polished.

12 Claims, 6 Drawing Sheets (51) Int. Cl.
*C04B 41/87* (2006.01)
*C04B 41/00* (2006.01)
*C04B 41/45* (2006.01)

(56) References Cited

U.S. PATENT DOCUMENTS

| | | | |
|---|---|---|---|
| 4,439,248 A | 3/1984 | Herchenroeder et al. | |
| 4,642,440 A | 2/1987 | Schnackel et al. | |
| 4,704,299 A | 11/1987 | Wielonski et al. | |
| 4,880,614 A | 11/1989 | Strangman et al. | |
| 5,381,944 A | 1/1995 | Makowiecki et al. | |
| 5,415,756 A | 5/1995 | Wolfe et al. | |
| 5,626,923 A | 5/1997 | Fitzgibbons et al. | |
| 5,631,803 A | 5/1997 | Cameron et al. | |
| 5,687,679 A | 11/1997 | Mullin et al. | |
| 5,800,871 A | 9/1998 | Collins et al. | |
| 5,837,058 A | 11/1998 | Chen et al. | |
| 5,853,815 A | 12/1998 | Muehlberger | |
| 5,916,689 A | 6/1999 | Collins et al. | |
| 6,106,959 A | 8/2000 | Vance et al. | |
| 6,194,083 B1 | 2/2001 | Yasuda et al. | |
| 6,245,202 B1 | 6/2001 | Edamura et al. | |
| 6,361,645 B1 | 3/2002 | Schoepp et al. | |
| 6,506,254 B1 | 1/2003 | Bosch et al. | |
| 6,530,990 B2 | 3/2003 | Kong et al. | |
| 6,534,194 B2 | 3/2003 | Weihs et al. | |
| 6,581,275 B2 | 6/2003 | Narendrnath et al. | |
| 6,616,031 B2 | 9/2003 | Wong et al. | |
| 6,783,875 B2 | 8/2004 | Yamada et al. | |
| 6,794,059 B2 | 9/2004 | Shanker | |
| 6,805,952 B2 | 10/2004 | Chang et al. | |
| 6,933,254 B2 | 8/2005 | Morita et al. | |
| 6,942,929 B2 | 9/2005 | Han et al. | |
| 7,300,537 B2 * | 11/2007 | O'Donnell et al. | 156/345.51 |
| 7,351,482 B2 | 4/2008 | Boutwell et al. | |
| 7,441,688 B2 | 10/2008 | Van Heerden et al. | |
| 7,507,268 B2 | 3/2009 | Rosenflanz | |
| 7,510,641 B2 | 3/2009 | Kreiskott et al. | |
| 7,615,133 B2 | 11/2009 | Tateno et al. | |
| 7,648,782 B2 | 1/2010 | Kobayashi et al. | |
| 7,649,729 B2 | 1/2010 | Buchberger, Jr. et al. | |
| 7,690,308 B2 | 4/2010 | Nielson et al. | |
| 7,696,117 B2 | 4/2010 | Sun et al. | |
| 7,810,704 B2 | 10/2010 | Duckham et al. | |
| 7,964,517 B2 | 6/2011 | Jaiswal | |
| 8,034,734 B2 | 10/2011 | Sun et al. | |
| 8,206,829 B2 | 6/2012 | Sun et al. | |
| 8,367,227 B2 | 2/2013 | Sun et al. | |
| 8,404,572 B2 | 3/2013 | Chang et al. | |
| 2001/0003271 A1 | 6/2001 | Otsuki | |
| 2002/0018921 A1 * | 2/2002 | Yamada et al. | 428/697 |
| 2002/0086119 A1 | 7/2002 | Hariharan et al. | |
| 2002/0100424 A1 | 8/2002 | Sun et al. | |
| 2003/0007308 A1 | 1/2003 | Harada et al. | |
| 2003/0047802 A1 | 3/2003 | Hiramatsu et al. | |
| 2003/0159657 A1 | 8/2003 | Kaushai et al. | |
| 2003/0185965 A1 | 10/2003 | Lin et al. | |
| 2003/0232139 A1 | 12/2003 | DeTura | |
| 2004/0009297 A1 * | 1/2004 | Fusaro et al. | 427/282 |
| 2004/0033385 A1 | 2/2004 | Kaushai et al. | |
| 2004/0110016 A1 | 6/2004 | Hamaya et al. | |
| 2004/0266216 A1 | 12/2004 | Li et al. | |
| 2005/0037193 A1 | 2/2005 | Sun et al. | |
| 2005/0042876 A1 | 2/2005 | Kobayashi et al. | |
| 2005/0056056 A1 | 3/2005 | Wong | |
| 2005/0084654 A1 | 4/2005 | Takahashi et al. | |
| 2005/0266682 A1 | 12/2005 | Chen et al. | |
| 2006/0068189 A1 | 3/2006 | Raybould et al. | |
| 2006/0096703 A1 | 5/2006 | Moriya et al. | |
| 2006/0164785 A1 | 7/2006 | Pellegrin | |
| 2007/0006561 A1 | 1/2007 | Brady et al. | |
| 2007/0212567 A1 | 9/2007 | Esaki et al. | |
| 2007/0218302 A1 | 9/2007 | Kobayashi et al. | |
| 2008/0016684 A1 | 1/2008 | Olechnowicz et al. | |
| 2008/0029032 A1 | 2/2008 | Sun et al. | |
| 2008/0090034 A1 | 4/2008 | Harrison et al. | |
| 2008/0099148 A1 | 5/2008 | Ryabova et al. | |
| 2008/0108225 A1 | 5/2008 | Sun et al. | |
| 2008/0169588 A1 | 7/2008 | Shih et al. | |
| 2008/0174930 A1 | 7/2008 | Hattori et al. | |
| 2008/0213496 A1 * | 9/2008 | Sun et al. | 427/453 |
| 2008/0223725 A1 | 9/2008 | Han et al. | |
| 2008/0241412 A1 * | 10/2008 | Inaki et al. | 427/448 |
| 2008/0264564 A1 | 10/2008 | Sun et al. | |
| 2008/0264565 A1 | 10/2008 | Sun et al. | |
| 2008/0268645 A1 | 10/2008 | Kao et al. | |
| 2009/0034147 A1 | 2/2009 | Narendrnath et al. | |
| 2009/0034148 A1 | 2/2009 | Lubomirsky et al. | |
| 2009/0034149 A1 | 2/2009 | Lubomirsky et al. | |
| 2009/0036292 A1 | 2/2009 | Sun et al. | |
| 2009/0075486 A1 | 3/2009 | Kikuyama et al. | |
| 2009/0133713 A1 | 5/2009 | Ohmi et al. | |
| 2009/0214825 A1 * | 8/2009 | Sun et al. | 428/141 |
| 2009/0284894 A1 | 11/2009 | Cooke | |
| 2009/0297718 A1 | 12/2009 | Sarrafi-Nour et al. | |
| 2010/0053841 A1 | 3/2010 | Rusinko, Jr. et al. | |
| 2010/0112192 A1 | 5/2010 | Li et al. | |
| 2010/0119843 A1 | 5/2010 | Sun et al. | |
| 2010/0160143 A1 | 6/2010 | Sun et al. | |
| 2010/0177454 A1 | 7/2010 | Elliot et al. | |
| 2010/0218472 A1 | 9/2010 | Iyer et al. | |
| 2010/0272982 A1 | 10/2010 | Dickinson et al. | |
| 2010/0314356 A1 | 12/2010 | Nagayama et al. | |
| 2011/0049729 A1 | 3/2011 | Naundorf et al. | |
| 2011/0086178 A1 | 4/2011 | Ruud et al. | |
| 2011/0149462 A1 | 6/2011 | Kugimoto et al. | |
| 2011/0151237 A1 | 6/2011 | Nakano et al. | |
| 2011/0174441 A1 | 7/2011 | Yamashita et al. | |
| 2011/0198034 A1 | 8/2011 | Sun et al. | |
| 2011/0268877 A1 | 11/2011 | Dickson et al. | |
| 2011/0268956 A1 | 11/2011 | Altuna et al. | |
| 2011/0315081 A1 | 12/2011 | Law et al. | |
| 2012/0034469 A1 | 2/2012 | Sun et al. | |
| 2012/0040100 A1 | 2/2012 | Matias et al. | |
| 2012/0076574 A1 | 3/2012 | Parke | |
| 2012/0100299 A1 | 4/2012 | Zajchowski et al. | |
| 2012/0104703 A1 | 5/2012 | Sun et al. | |
| 2012/0125488 A1 | 5/2012 | Sun et al. | |
| 2012/0299253 A1 | 11/2012 | Kosakai et al. | |
| 2012/0307412 A1 | 12/2012 | Boyd, Jr. et al. | |
| 2013/0019797 A1 | 1/2013 | Tanaka et al. | |
| 2013/0026720 A1 | 1/2013 | Hori et al. | |
| 2013/0174983 A1 | 7/2013 | Kikuchi et al. | |
| 2013/0216783 A1 | 8/2013 | Duan et al. | |
| 2013/0216821 A1 | 8/2013 | Sun et al. | |
| 2013/0224675 A1 | 8/2013 | Park | |
| 2013/0273313 A1 | 10/2013 | Sun et al. | |
| 2013/0273327 A1 | 10/2013 | Sun et al. | |
| 2013/0284373 A1 | 10/2013 | Sun et al. | |
| 2013/0288037 A1 | 10/2013 | Sun et al. | |
| 2014/0030486 A1 | 1/2014 | Sun et al. | |
| 2014/0030533 A1 | 1/2014 | Sun et al. | |

FOREIGN PATENT DOCUMENTS

| | | |
|---|---|---|
| JP | 2002-087878 | 3/2002 |
| JP | 2005-279481 | 10/2005 |
| JP | 2010-106327 | 5/2010 |
| JP | 2010-229492 | 10/2010 |
| KR | 10-2003-0025007 | 3/2003 |
| KR | 10-2007-0013118 | 1/2007 |
| KR | 10-2011-0028378 | 3/2011 |
| KR | 10-2011-0117845 | 10/2011 |
| WO | WO 01/24581 | 4/2001 |
| WO | WO 02/00968 | 1/2002 |
| WO | WO 2013/126466 | 8/2013 |
| WO | WO 2013/155220 | 10/2013 |
| WO | WO 2013/162909 | 10/2013 |

(56) References Cited

FOREIGN PATENT DOCUMENTS

| WO | WO 2014/018830 | 1/2014 |
|---|---|---|
| WO | WO 2014/018835 | 1/2014 |

OTHER PUBLICATIONS

Ulrike Taffner et al., "Preparation and Microstructural Analysis of High-Performance Ceramics," ASM Handbook vol. 9: Metallography and Microstructures, 2004, 11 pages, ASM International, Materials Park, Ohio, USA.
Hass et al., "Gas jet assisted vapor deposition of yttria stabilized zircona," Department of Materials Science and Engineering, School of Engineering and Applied Science, University of Virginia, Charlottesville, Virginia, 22903, published Feb. 27, 2009.
Di Girolamo et al., "Microstructure and thermal properties of plasma-sprayed ceramic thermal barrier coatings," Energia, Ambiente e Innovazione, Published Jan. 2, 2013.
Bergant et al., "Porosity evaluation of flame-sprayed and heat-treated coatings using image analysis," Image Anal Stereo 2011;30:53-62, Published Jan. 27, 2011.
Smith, et al., "Very Low Pressure Plasma Spray—A Review of an Emerging Technology in the Thermal Spray Community," Coatings 2011, 1, 117-132; doi:10.3390/coatings1020117, Published Dec. 20, 2011.
International Search Report mailed Apr. 13, 2013 in PCT/US2013/036028.
International Search Report & Written Opinion of the International Searching Authority dated Apr. 25, 2013, in International Application No. PCT/US2013/026963.
Zircotec—Plasma sprayed ceramic thermal coatings, http://www.zircotec.com/page/plasma-spray-processing/39, downloaded Apr. 4, 2014.
Nakamura et al., "Effects of Pores on Mechanical Properties of Plasma-Sprayed Ceramic Coatings," J. Am. Ceram. Soc., 83 [3] 578-84, Mar. 2000.
Govidarajan et al., "In situ Particle Generation and Splat Formation During Solution Precursor Plasma Spraying of Yttria-Stabilized Zirconia Coatings," J Am. Ceram. Soc., 1-9 (2011).
"Thermal Spraying," definition, Wikipedia, http://en.wikipedia.org/wiki/Thermal_spraying, downloaded Apr. 14, 2014.
U.S. Appl. No. 13/745,592, Non-Final Office Action mailed Mar. 5, 2014.
U.S. Appl. No. 13/659,813, Non-Final Office Action mailed Oct. 21, 2013.
U.S. Appl. No. 13/659,813, Final Office Action mailed Mar. 26, 2014.
Kitamura et al., "Structural, Mechanical and Erosion Properties of Yttrium Oxide Coatings by Axial Suspension Plasma Spraying for Electronics Applications," Journal of Thermal Spray Technology, 20:170-185, Jan. 2011.
International Search Report & Written Opinion of the International Searching Authority dated Jun. 26, 2013, in International Application No. PCT/US2013/036028.

* cited by examiner

CERAMIC COATED ARTICLE AND PROCESS FOR APPLYING CERAMIC COATING

RELATED APPLICATIONS

This patent application claims the benefit under 35 U.S.C. §119(e) of U.S. Provisional Application No. 61/624,937, filed Apr. 16, 2012.

TECHNICAL FIELD

Embodiments of the present invention relate, in general, to ceramic coated articles and to a process for applying a ceramic coating to a ceramic body.

BACKGROUND

In the semiconductor industry, devices are fabricated by a number of manufacturing processes producing structures of an ever-decreasing size. Some manufacturing processes such as plasma etch and plasma clean processes expose a substrate to a high-speed stream of plasma to etch or clean the substrate. The plasma may be highly corrosive, and may corrode processing chambers and other surfaces that are exposed to the plasma. This corrosion may generate particles, which frequently contaminate the substrate that is being processed, contributing to device defects.

As device geometries shrink, susceptibility to defects increases, and particle contaminant requirements become more stringent. Accordingly, as device geometries shrink, allowable levels of particle contamination may be reduced. To minimize particle contamination introduced by plasma etch and/or plasma clean processes, chamber materials have been developed that are resistant to plasmas. Examples of such plasma resistant materials include ceramics composed of $Al_2O_3$, AlN, SiC, $Y_2O_3$, quartz, and ZrO2. Different ceramics provide different material properties, such as plasma resistance, rigidity, flexural strength, thermal shock resistance, and so on. Also, difference ceramics have different material costs. Accordingly, some ceramics have superior plasma resistance, other ceramics have lower costs, and still other ceramics have superior flexural strength and/or thermal shock resistance.

SUMMARY

In one embodiment, a ceramic article includes a ceramic body and a ceramic coating on the ceramic body. To manufacture the ceramic article, a ceramic body comprising $Al_2O_3$ is roughened to a roughness of approximately 140 microinches (μin) to 240 μin. The ceramic body is subsequently cleaned and then coated with a ceramic coating. The ceramic coating includes a compound of $Y_4Al_2O_9$ (YAM) and a solid solution of $Y_2\text{-}xZr_xO_3$. The ceramic coating is then polished.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments of the invention are directed to a process for coating a ceramic body with a ceramic coating, and to a ceramic article (e.g., a lid for a plasma etch reactor) created using such a coating process. In one embodiment, a ceramic body is roughened, cleaned and coated with a ceramic coating. Parameters for the roughening, the cleaning and the coating may be optimized to maximize an adhesion strength of the ceramic coating to the ceramic body, and thus to reduce future delamination of the ceramic coating from the ceramic body. The ceramic coating may then be machined to remove jagged edges and/or to reduce a surface roughness. The machining may further reduce delamination of the ceramic coating from the ceramic body.

The ceramic coating of the ceramic article may be highly resistant to plasma etching, and the ceramic body may have superior mechanical properties such as a high flexural strength and a high thermal shock resistance. For example, $Al_2O_3$ has a high thermo-mechanical strength, but also has relatively high aluminum contamination levels and a low plasma resistance. In contrast, $Y_2O_3$ containing ceramics have enhanced plasma resistance and a low on-wafer level aluminum contamination, but have a relatively low thermo-mechanical strength. Accordingly, the ceramic article may have the advantageous properties of a first ceramic substance (e.g., $Al_2O_3$) and the advantageous properties of a second ceramic substance (e.g., a $Y_2O_3$ containing ceramic), without the weaknesses of either ceramic substance. Performance properties of the coated ceramic article may include a relatively high thermal capability (e.g., ability to withstand operating temperatures of up to approximately 120° C.), a relatively long lifespan (e.g., over approximately 2 years when used in a plasma environment), low on-wafer particle and metal contamination, and a stable electrostatic chuck (ESC) leakage current performance (e.g., by blocking the formation of AlF at the ceramic article).

When the terms "about" and "approximately" are used herein, these are intended to mean that the nominal value presented is precise within ±10%. Note also that some embodiments are described herein with reference to ceramic lids and ceramic nozzles used in plasma etchers for semiconductor manufacturing. However, it should be understood that such plasma etchers may also be used to manufacture micro-electro-mechanical systems (MEMS)) devices. Additionally, the ceramic articles described herein may be other structures that are exposed to plasma. For example, the ceramic articles may be ceramic rings, walls, bases, gas distribution plates, shower heads, substrate holding frames, etc. of a plasma etcher, a plasma cleaner, a plasma propulsion system, and so forth.

Moreover, embodiments are described herein with reference to ceramic articles that cause reduced particle contamination when used in a process chamber for plasma rich processes. However, it should be understood that the ceramic articles discussed herein may also provide reduced particle contamination when used in process chambers for other processes such as plasma enhanced chemical vapor deposition (PECVD) chambers, plasma enhanced physical vapor deposition (PEPVD) chambers and plasma enhanced atomic layer deposition (PEALD) chambers, as well as non-plasma etchers, non-plasma cleaners, chemical vapor deposition (CVD) furnaces, physical vapor deposition (PVD) furnaces, and so forth.

Figure 1:
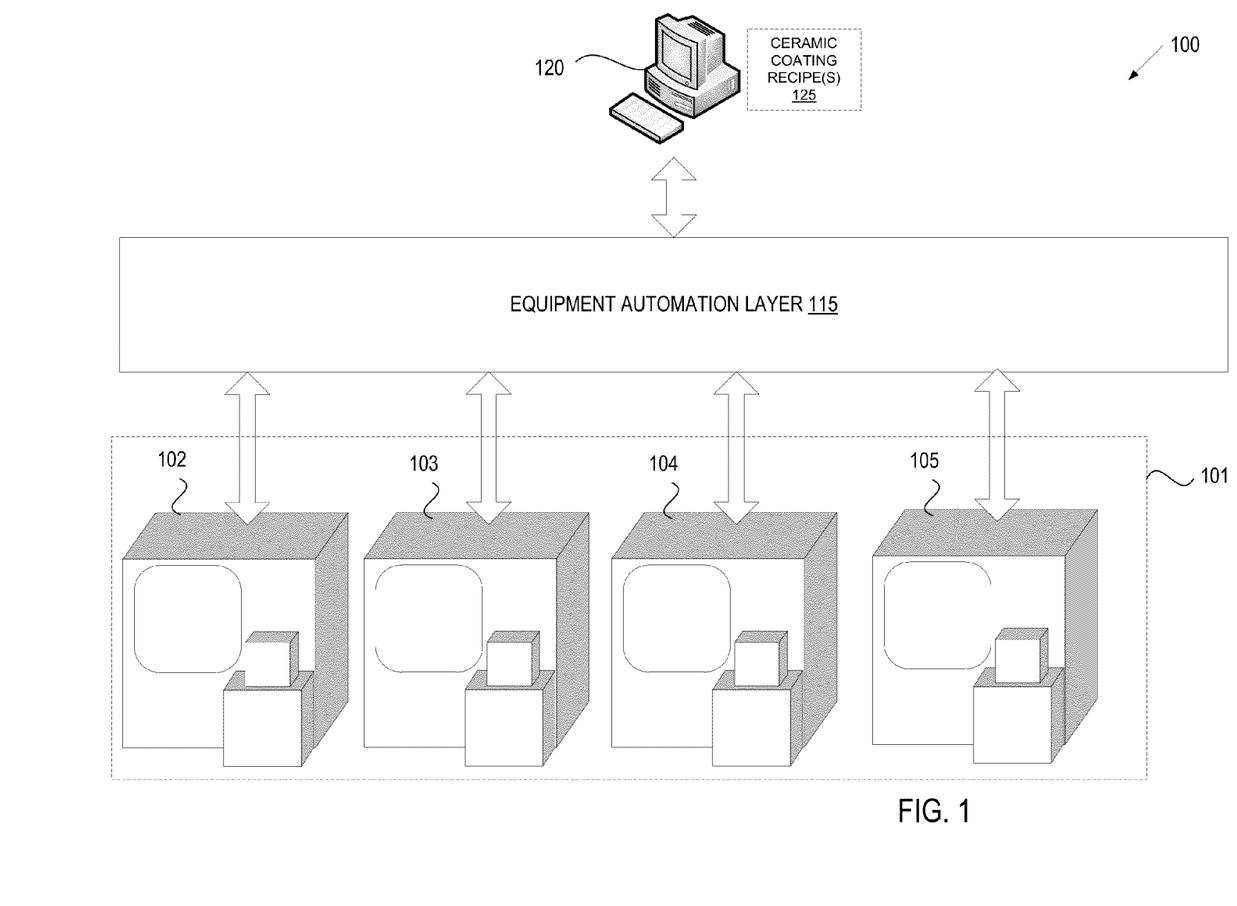
FIG. 1 illustrates an exemplary architecture of a manufacturing system, in accordance with one embodiment of the present invention.

FIG. 1 illustrates an exemplary architecture of a manufacturing system 100, in accordance with embodiments of the present invention. The manufacturing system 100 may be a ceramics manufacturing system. In one embodiment, the manufacturing system 100 includes processing equipment 101 connected to an equipment automation layer 115. The processing equipment 101 may include a bead blaster 102, one or more wet cleaners 103, a ceramic coater 104 and/or one or more grinders 105. The manufacturing system 100 may further include one or more computing device 120 connected to the equipment automation layer 115. In alternative embodiments, the manufacturing system 100 may include more or fewer components. For example, the manufacturing system 100 may include manually operated (e.g., off-line) processing equipment 101 without the equipment automation layer 115 or the computing device 120.

Bead blaster 102 is a machine configured to roughen the surface of articles such as ceramic bodies. Bead blaster 102 may be a bead blasting cabinet, a hand held bead blaster, or other type of bead blaster. Bead blaster 102 may roughen a ceramic body by bombarding the ceramic body with beads or particles. In one embodiment, bead blaster 102 fires ceramic beads or particles at the ceramic body. The roughness achieved by the bead blaster 102 may be based on a force used to fire the beads, bead materials, bead sizes and/or processing duration. In one embodiment, the bead blaster uses a range of bead sizes to roughen the ceramic article.

In alternative embodiments, other types of surface rougheners than a bead blaster 102 may be used. For example, a motorized abrasive pad may be used to roughen the surface of ceramic bodies. A sander may rotate or vibrate the abrasive pad while the abrasive pad is pressed against a surface of the ceramic article. A roughness achieved by the abrasive pad may depend on an applied pressure, on a vibration or rotation rate and/or on a roughness of the abrasive pad.

Wet cleaners 103 are cleaning apparatuses that clean articles (e.g., ceramic articles) using a wet clean process. Wet cleaners 103 include wet baths filled with liquids, in which the ceramic body is immersed to clean the ceramic body. Wet cleaners 103 may agitate the wet bath using ultrasonic waves during cleaning to improve a cleaning efficacy. This is referred to herein as sonicating the wet bath.

In one embodiment, wet cleaners 103 include a first wet cleaner that cleans the ceramic articles using a bath of de-ionized (DI) water and a second wet cleaner that cleans the ceramic articles using a bath of acetone. Both wet cleaners 103 may sonicate the baths during cleaning processes. The wet cleaners 103 may clean the ceramic body at multiple stages during processing. For example, wet cleaners 103 may clean a ceramic article after a ceramic body has been roughened, after a ceramic coating has been applied to the ceramic body, after the ceramic article has been used in processing, and so forth.

In other embodiments, alternative types of cleaners such as dry cleaners may be used to clean the ceramic articles. Dry cleaners may clean ceramic articles by applying heat, by applying gas, by applying plasma, and so forth.

Ceramic coater 104 is a machine configured to apply a ceramic coating to the surface of a body (e.g. a substrate). In one embodiment, ceramic coater 104 is a plasma sprayer that plasma sprays a ceramic coating onto the ceramic body.

In alternative embodiments, the ceramic coater 104 may apply other thermal spraying techniques such as detonation spraying, wire arc spraying, high velocity oxygen fuel (HVOF) spraying, flame spraying, warm spraying and cold spraying may be used. Additionally, ceramic coater 104 may perform other coating processes such as aerosol deposition, electroplating, physical vapor deposition (PVD), ion assisted deposition (IAD) and chemical vapor deposition (CVD) may be used to form the ceramic coating.

Grinders 105 are machines having an abrasive disk that grinds and/or polishes a surface of the ceramic article. The grinders 105 may include a polishing/grinding system such as a rough lapping station, a chemical mechanical planarization (CMP) device, and so forth. The grinders 105 may include a platen that holds a ceramic body and an abrasive disk or polishing pad that is pressed against the ceramic body while being rotated. These grinders 105 grind a surface of the ceramic coating to decrease a roughness of the ceramic coating and/or to reduce a thickness of the ceramic coating. The grinders 105 may grind/polish the ceramic coating in multiple steps, where each step uses an abrasive pad with a slightly different roughness and/or a different slurry (e.g., if CMP is used). For example, a first abrasive pad with a high roughness may be used to quickly grind down the ceramic coating to a desired thickness, and a second abrasive pad with a low roughness may be used to polish the ceramic coating to a desired roughness. In one embodiment, the ceramic coating has a post-polished thickness of 8-10 mil (thousandth of an inch) and a post polished roughness of 6-12 $\mu$in.

The grinders 105 may additionally include an angle grinder that grinds the ceramic coating at an angle. The angle grinder has an abrasive disk or pad that is held at an angle to the ceramic body. The angle grinder can trim the ceramic coating, and generate chamfers, rounded edges or other sloped transitions between a ceramic coating and a ceramic body.

The equipment automation layer 115 may interconnect some or all of the manufacturing machines 101 with computing devices 120, with other manufacturing machines, with metrology tools and/or other devices. The equipment automation layer 115 may include a network (e.g., a location area network (LAN)), routers, gateways, servers, data stores, and so on. Manufacturing machines 101 may connect to the equipment automation layer 115 via a SEMI Equipment Communications Standard/Generic Equipment Model (SECS/GEM) interface, via an Ethernet interface, and/or via other interfaces. In one embodiment, the equipment automation layer 115 enables process data (e.g., data collected by manufacturing machines 101 during a process run) to be stored in a data store (not shown). In an alternative embodiment, the computing device 120 connects directly to one or more of the manufacturing machines 101.

In one embodiment, some or all manufacturing machines 101 include a programmable controller that can load, store and execute process recipes. The programmable controller may control temperature settings, gas and/or vacuum settings, time settings, etc. of manufacturing machines 101. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing heat treatment processes described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, programmable controller is a programmable logic controller (PLC).

In one embodiment, the manufacturing machines 101 are programmed to execute recipes that will cause the manufacturing machines to roughen a body, clean a body and/or ceramic article, coat a ceramic article and/or machine (e.g., grind or polish) a ceramic article. In one embodiment, the manufacturing machines 101 are programmed to execute recipes that perform operations of a multi-step process for manufacturing a coated ceramic article, as described with reference to FIG. 2.

Figure 2:
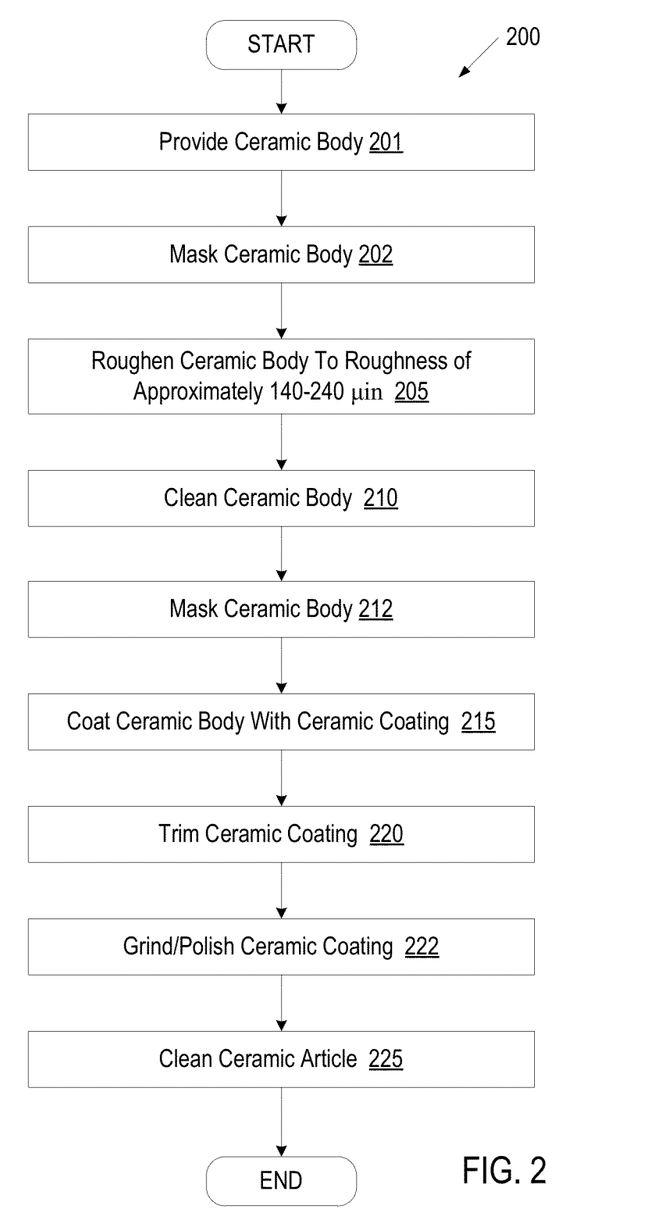
FIG. 2 is a flow chart showing a process for manufacturing a coated ceramic article, in accordance with embodiments of the present invention.

FIG. 2 is a flow chart showing a process 200 for manufacturing a coated ceramic article, in accordance with embodiments of the present invention. The operations of process 200 may be performed by various manufacturing machines, as set forth in FIG. 1.

At block 201, a ceramic body (e.g., a ceramic substrate) is provided. The ceramic body may be formed from a bulk ceramic such as $Y_2O_3$ (yttria), $Y_4Al_2O_9$ (YAM), $Al_2O_3$ (alumina), $Y_3Al_5O_{12}$ (YAG), Quartz, $YAlO_3$ (YAP), SiC (silicon carbide), $Si_3N_4$ (silicon nitride), AlN (aluminum nitride), $ZrO_2$ (zirconia), AlON (aluminum oxynitride), $TiO_2$ (titania), TiC (titanium carbide), ZrC (zirconium carbide), TiN (titanium nitride), TiCN (titanium carbon nitride), $Y_2O_3$ stabilized $ZrO_2$ (YSZ), and so on. The body may also be a ceramic composite such as an $Al_2O_3$-YAG ceramic composite or a SiC—$Si_3N_4$ ceramic composite. The ceramic body may also be a ceramic composite that includes a yttrium oxide (also known as yttria and $Y_2O_3$) containing solid solution. For example, the ceramic body may be a high performance material (HPM) that is composed of a compound $Y_4Al_2O_9$ (YAM) and a solid solution $Y_2$-$xZr_xO_3$ ($Y_2O_3$—$ZrO_2$ solid solution). Note that pure yttrium oxide as well as yttrium oxide containing solid solutions may be doped with one or more of $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides. In one embodiment, the ceramic body is bulk $Al_2O_3$, which may have been formed based on ceramic sintering. In one embodiment, the ceramic body has a thickness of approximately 1 in.

At block 202, the provided ceramic body is masked to cover portions or regions of the ceramic body that will not be roughened. Any region that will not ultimately be coated with a ceramic coating may be masked. In one embodiment, a hard mask (e.g., a metal mask) is used to mask the region.

At block 205 of process 200, the ceramic body is roughened by a bead blaster (or other ceramic roughener). In one embodiment, the bead blaster uses ceramic beads to blast the quartz ring. The ceramic beads may have a bead size of approximately 0.2-2 mm. In one embodiment, the ceramic beads have a size range of approximately 0.2-2 mm. The bead blaster may bead blast the quartz ring with an air pressure of approximately 30-90 psi and a working distance of approximately 50-150 mm, and the blasting angle to the body should be about or slightly less than 90 degree. The bead blaster may roughen exposed portions of the ceramic body (those portions not covered by the mask).

In one embodiment, a processed ceramic body has a post-blast roughness of approximately 140-240 μin. Roughening the ceramic body to an optimal roughness may improve adhesion strength of a ceramic coating to the ceramic body.

At block 210, the roughened ceramic body is cleaned. The ceramic body may be cleaned using one or more wet cleaners. Each wet cleaner may contain one or more wet baths with various liquids, such as deionized (DI) water and acetone. In one embodiment, a first wet cleaner executes a cleaning recipe that cleans the ceramic article for up to 10 minutes in a DI water bath, while ultrasonically agitating the DI water bath with a frequency and power of up to 100%. In one embodiment, a second wet cleaner executes a cleaning recipe that cleans the ceramic article for up to 10 minutes in an acetone bath, while ultrasonically agitating the acetone bath with a frequency and power of up to 100%. The ceramic body may then be cleaned with the first wet cleaner a second time using the same or different processing parameters. This may remove any residue caused by the acetone bath, and may further remove ceramic particles. In one embodiment, the ceramic body is cleaned by both wet cleaners multiple times. For example, the ceramic body may be cleaned in a DI bath, then in an acetone bath, then in the DI bath, then in the acetone bath, and then in the DI bath.

At block 212, the ceramic body is masked. Those portions of the ceramic body that were not roughened (e.g., the same portions that were previously masked) may be masked. In one embodiment, a soft mask is used to cover the portions that are not to be roughened. The soft mask may be, for example, a tape that is placed over the portions that will not be roughened.

At block 215, the roughened ceramic body is coated with a ceramic coating. A side of the ceramic body that will be exposed to a plasma environment may be coated. In one embodiment, a plasma sprayer is used to plasma spray the ceramic coating onto the ceramic body.

The mixed raw ceramic powders are then sprayed onto the ceramic body. The ceramic body may be heated to a temperature of approximately 50-70° C. during the plasma spraying. In one embodiment, a plasma power of approximately 35-36.5 Watts (W) is used to plasma spray the ceramic body. The plasma spray process may be performed in multiple spray passes. In one embodiment, approximately 35-40 spray passes are applied to create a ceramic coating having a thickness of approximately 17.5-21 mil.

The ceramic coating may have a porosity of approximately 2-10% (e.g., less than approximately 5% in one embodiment), a hardness of approximately 3-8 gigapascals (GPa) (e.g., greater than approximately 4 GPa in one embodiment), and a thermal shock resistance of approximately 8-20 megapascals (MPa) (e.g., greater than approximately 10 MPa in one embodiment). Additionally, the ceramic coating may have an adhesion strength of approximately 4-20 MPa (e.g., greater than approximately 14 MPa in one embodiment). Adhesion strength may be determined by applying a force (e.g., measured in megapascals) to the ceramic coating until the ceramic coating peels off from the ceramic body.

Similar to the ceramic body, the ceramic coating may be formed of $Y_2O_3$, $Y_4Al_2O_9$, $Al_2O_3$, $Y_3Al_5O_{12}$ (YAG), Quartz, SiC, $Si_3N_4$, AlN, $ZrO_2$, or any other ceramics described above with reference to the ceramic body. Also similar to the ceramic body, the ceramic coating may be pure yttrium oxide or a yttrium oxide containing solid solution that may be doped with one or more of $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides. In one embodiment, the ceramic coating is composed of the HPM ceramic. However, the ceramic coating is formed by spraying or growing the ceramic coating on the ceramic body, and the ceramic body may be formed by a sintering process.

In one embodiment, the ceramic coating is a yttrium oxide containing ceramic or other yttrium containing oxide that is deposited on the ceramic body using a thermal spraying technique or plasma spraying technique. Thermal spraying techniques and plasma spraying techniques may melt materials (e.g., ceramic powders) and spray the melted materials onto the ceramic body. The thermally sprayed or plasma sprayed ceramic coating may have a thickness about 20 micrometers (μm) to about several millimeters (mm). The ceramic coating may have structural properties that are different from those of bulk ceramic materials (e.g., such as the ceramic body).

In one embodiment, the ceramic coating is produced from $Y_2O_3$ powder. Alternatively, the ceramic coating may be a HPM ceramic composite produced from a mixture of a $Y_2O_3$ powder, $ZrO_2$ powder and $Al_2O_3$ powder. In one embodiment, the HPM ceramic composite contains 77% $Y_2O_3$, 15% $ZrO_2$ and 8% $Al_2O_3$. In another embodiment, the HPM ceramic composite contains 63% $Y_2O_3$, 23% $ZrO_2$ and 14% $Al_2O_3$. In still another embodiment, the HPM ceramic composite contains 55% $Y_2O_3$, 20% $ZrO_2$ and 25% $Al_2O_3$. Relative percentages may be in molar ratios. For example, the HPM ceramic may contain 77 mol % $Y_2O_3$, 15 mol % $ZrO_2$ and 8 mol % $Al_2O_3$. Other distributions of these ceramic powders may also be used for the HPM material.

In one embodiment, raw ceramic powders of $Y_2O_3$, $Al_2O_3$ and $ZrO_2$ are mixed together. These raw ceramic powders may have a purity of 99.9% or greater in one embodiment. The raw ceramic powders may be mixed using, for example, ball milling. The raw ceramic powders may have a powder size of approximately 3-10 μm. In one embodiment, the raw ceramic powders have a powder size of approximately 5 μm. After the ceramic powders are mixed, they may be calcinated at a calcination temperature of approximately 1200-1600° C. (e.g., 1400° C. in one embodiment) and a calcination time of approximately 2-5 hours (e.g., 3 hours in one embodiment). The spray dried granular particle size for the mixed powder may have a size distribution of approximately 30 μm.

At block 220, the ceramic coating is trimmed. In one embodiment, edges of the ceramic coating are trimmed where the ceramic coating interfaces with the ceramic body. The ceramic coating may be ground at an angle (e.g., using an angle grinder) to chamfer the ceramic coating at the interfaces. The trimming may remove any ceramic coating from the non-roughened portions of the ceramic body. This may minimize peeling.

At block 222, the ceramic coating is ground, lapped and/or polished. The grinding/polishing may reduce a thickness of the ceramic coating and/or reduce a roughness of the ceramic coating. The ceramic article (including the ceramic body and the ceramic coating) may be used as a chamber component (e.g., a lid) in a chamber for a plasma etcher (also known as a plasma etch reactor) used to perform a conductor etch. By minimizing the surface roughness of the ceramic coated article, inadvertent sputtering may be reduced or eliminated during etch processes. In one embodiment, the ceramic coating has a post-polish thickness of approximately 8-10 mil and a post-polish roughness of approximately 6-12 μin.

At block 225, the ceramic article is cleaned. The ceramic article may be cleaned using one or more wet cleaners. In one embodiment, a first wet cleaner executes a cleaning recipe that cleans the ceramic article for up to 10 minutes in a DI water bath, while ultrasonically agitating the DI water bath with a frequency and power of up to 100%. In one embodiment, a second wet cleaner executes a cleaning recipe that cleans the ceramic article for up to 10 minutes in an acetone bath, while ultrasonically agitating the acetone bath with a frequency and power of up to 100%. The ceramic article may then be cleaned with the first wet cleaner a second time.

After cleaning, the ceramic article may be tested for particles. Measured parameters that represent particle count are a tape peel test particle count and a liquid particle count (LPC). A tape test may be performed by attaching an adhesive tape to the ceramic coating, peeling the tape off, and counting a number of particles that adhere to the tape. The LPC may be determined by placing the ceramic article in a water bath (e.g., a de-ionized (DI) water bath) and sonicating the water bath. A number of particles that come off in the solution may then be counted using, for example, a laser counter.

In one embodiment, the ceramic article is automatically loaded into manufacturing machines that perform one or more of operations 205-225 by loaders. In one embodiment, the manufactured ceramic article is a ceramic lid, a ceramic nozzle, or another process chamber element for a plasma etcher or plasma cleaner. An example ceramic lid may include an $Al_2O_3$ body (or substrate) with at least one side coated by an HPM coating. In one embodiment, an outer edge of the at least one side of the ceramic lid is not coated. An example ceramic nozzle may include an $Al_2O_3$ body and an HPM layer coating at least one side.

Figure 3:
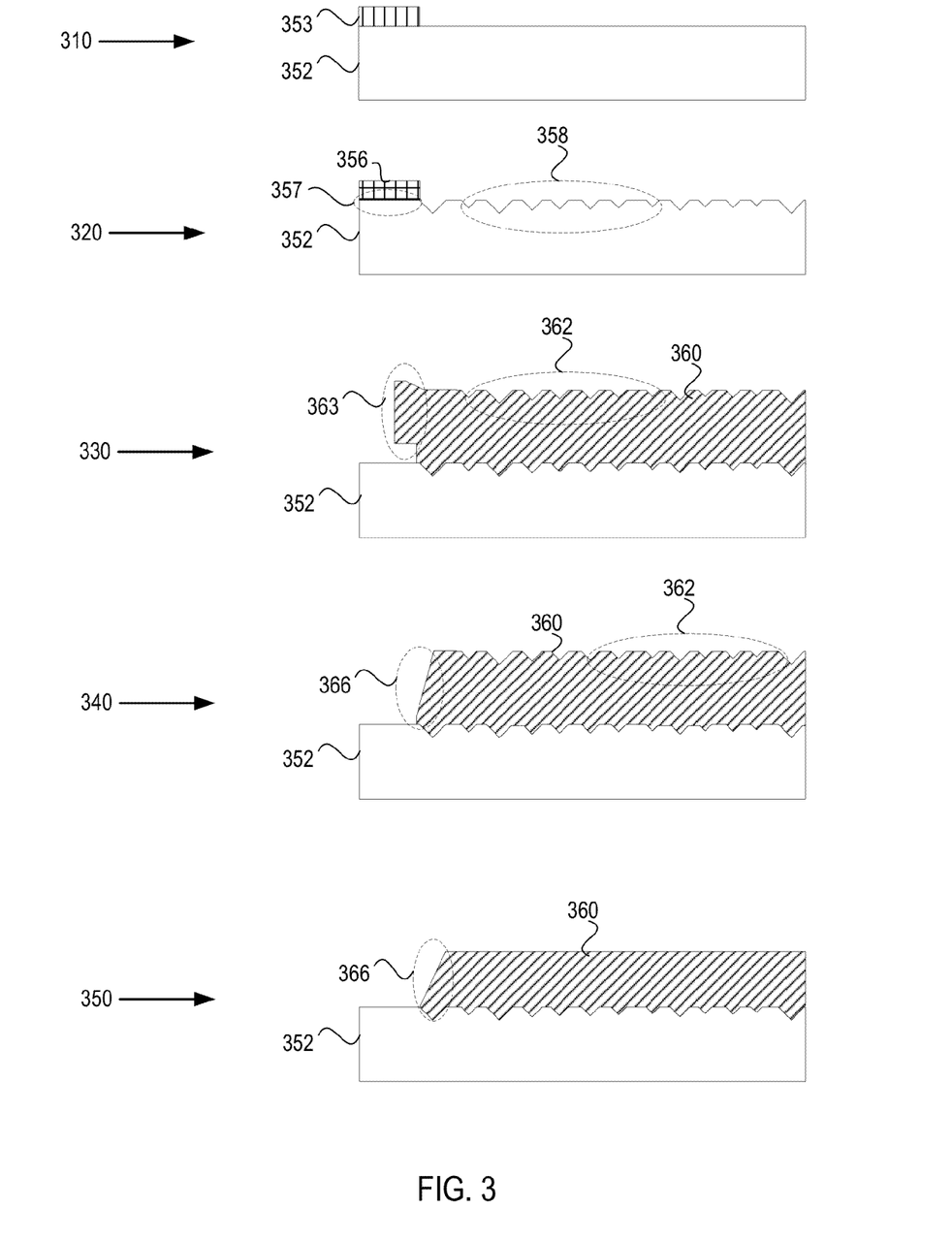
FIG. 3 shows cross sectional side views of a ceramic article during different stages of a manufacturing process, in accordance with embodiments of the present invention.

FIG. 3 shows cross sectional side views 310-350 of a ceramic article during different stages of a manufacturing process, in accordance with embodiments of the present invention. In one embodiment, the cross sectional side views correspond to a state of a ceramic article during different stages of manufacturing process 200.

Side view 310 shows a hard mask 353 disposed over a protected portion of a provided ceramic body (e.g. an $Al_2O_3$ ceramic body). Side view 310 shows a state of a ceramic article after completion of block 202 of method 200. The hard mask 353 may prevent the protected portion from becoming roughened during bead blasting.

Side view 320 shows the ceramic body 352 after bead blasting has been performed. The ceramic body 352 has a roughened surface 358, corresponding to a portion of the ceramic body that was not protected during the bead blasting. The ceramic body 352 additionally has a smooth surface 357 corresponding to a portion of the ceramic body that has not been roughened. As shown, a soft mask 356 is disposed on the ceramic body 352 over the smooth surface 357 after the ceramic body 352 has been roughened. The soft mask 356 may be used to cover a same region of the ceramic body 352 that was previously protected by the hard mask 353. Side view 320 shows a state of the ceramic article after completion of block 212.

Side view 330 shows a ceramic coating 360 over ceramic body 352. In one embodiment, the ceramic coating is a HPM ceramic composite having $Y_4Al_2O_9$ and $Y_2$-$xZr_xO_3$. As shown, the ceramic coating 360 has a rough surface 362. This rough surface may be a source of particle contamination when the ceramic article is used in processing. Additionally, if the ceramic article may be used as a lid in a plasma etcher that performs a conductor etch, the rough surface 362 may cause sputtering to occur (e.g., due to inductive coupling). Additionally, the ceramic coating may have a lip 363 and/or rough edges where the soft mask 356 had been. This lip 363 may cause the ceramic coating 360 to peel away from the ceramic body 352 during processing. Additionally, this lip may be a source of particle contamination. Side view 330 shows a state of the ceramic article after completion of block 215.

Side view 340 shows the ceramic coating 360 over the ceramic body 352 after edges of the ceramic coating 360 have been trimmed. Side view 340 shows a state of the ceramic article after completion of block 220. As shown, the ceramic coating 360 has a tapered or chamfered edge 366.

Side view 350 shows the ceramic coating 360 over the ceramic body 352 after the ceramic coating 360 has been ground and polished. Side view 350 shows a state of the ceramic article after completion of block 222. As shown, the rough surface 362 of the ceramic coating 360 has been smoothed, and a thickness of the ceramic coating 360 has been reduced.

Figure 4A:
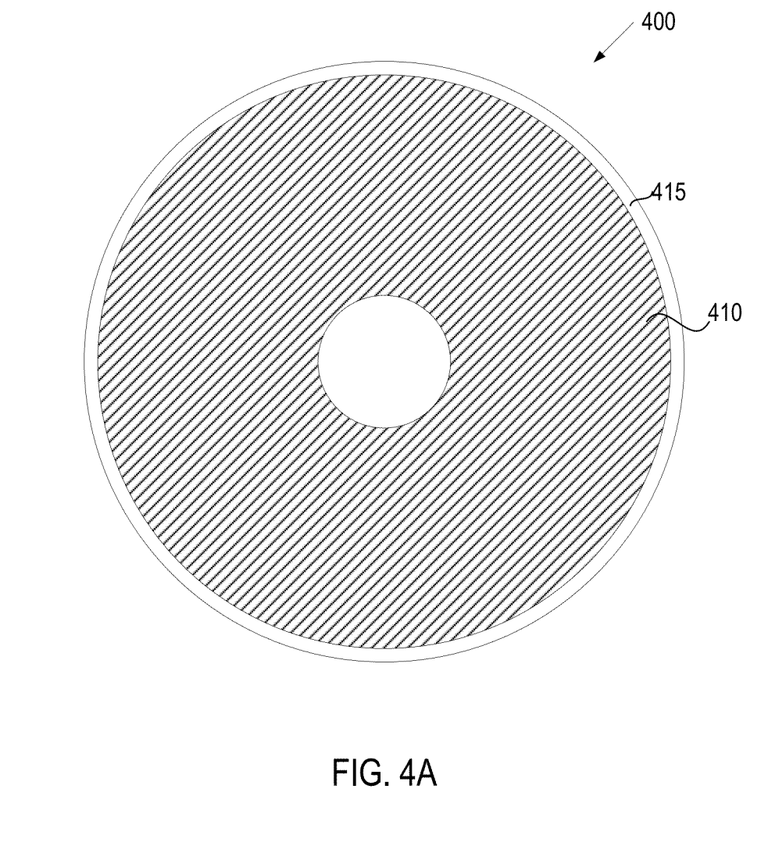
FIG. 4A illustrates a bottom view of a ceramic lid for an etcher, in accordance with one embodiment of the present invention.
Figure 4B:
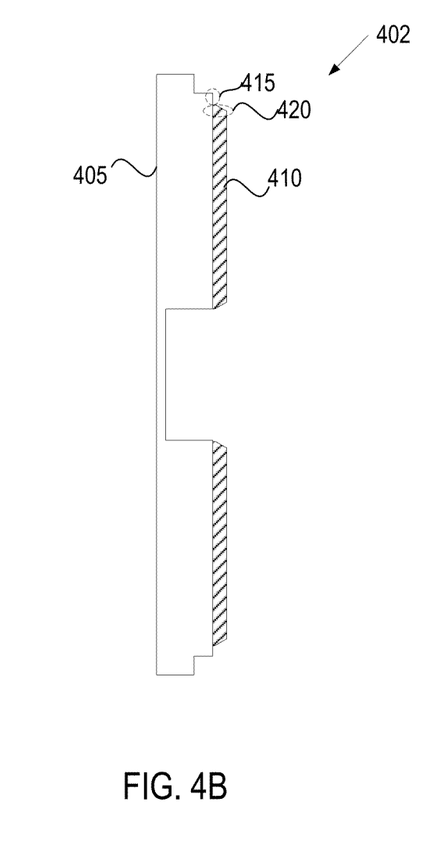
FIG. 4B illustrates a side view of a ceramic lid for an etcher, in accordance with one embodiment of the present invention.

FIG. 4A illustrates a bottom view 400 of a ceramic lid for an etcher, in accordance with one embodiment of the present invention. FIG. 4B illustrates a side view 402 of a ceramic lid for an etcher, in accordance with one embodiment of the present invention. As shown, the ceramic lid is composed of a ceramic body 405 with a hole in the center and a ceramic coating 410 over one side of the ceramic body 405. The ceramic coating 410 does not cover an entirety of the coated side of the ceramic body 405. For example, a lip 415 of the ceramic body 405 has no ceramic coating and the walls of the hole have no ceramic coating. The lip 415 may rest on walls of a process chamber, and may support the ceramic lid. The ceramic coating 410 may have weaker structural material properties than the ceramic body 405, and may be damaged due to pressure caused by resting on walls of the processing chamber. Accordingly, it may be advantageous to leave the lip 415 uncoated. A transition area 420 between the ceramic coating 410 and the ceramic body 405 at the lip 415 may be sloped or chamfered to minimize particle contamination and peeling.

Figure 5:
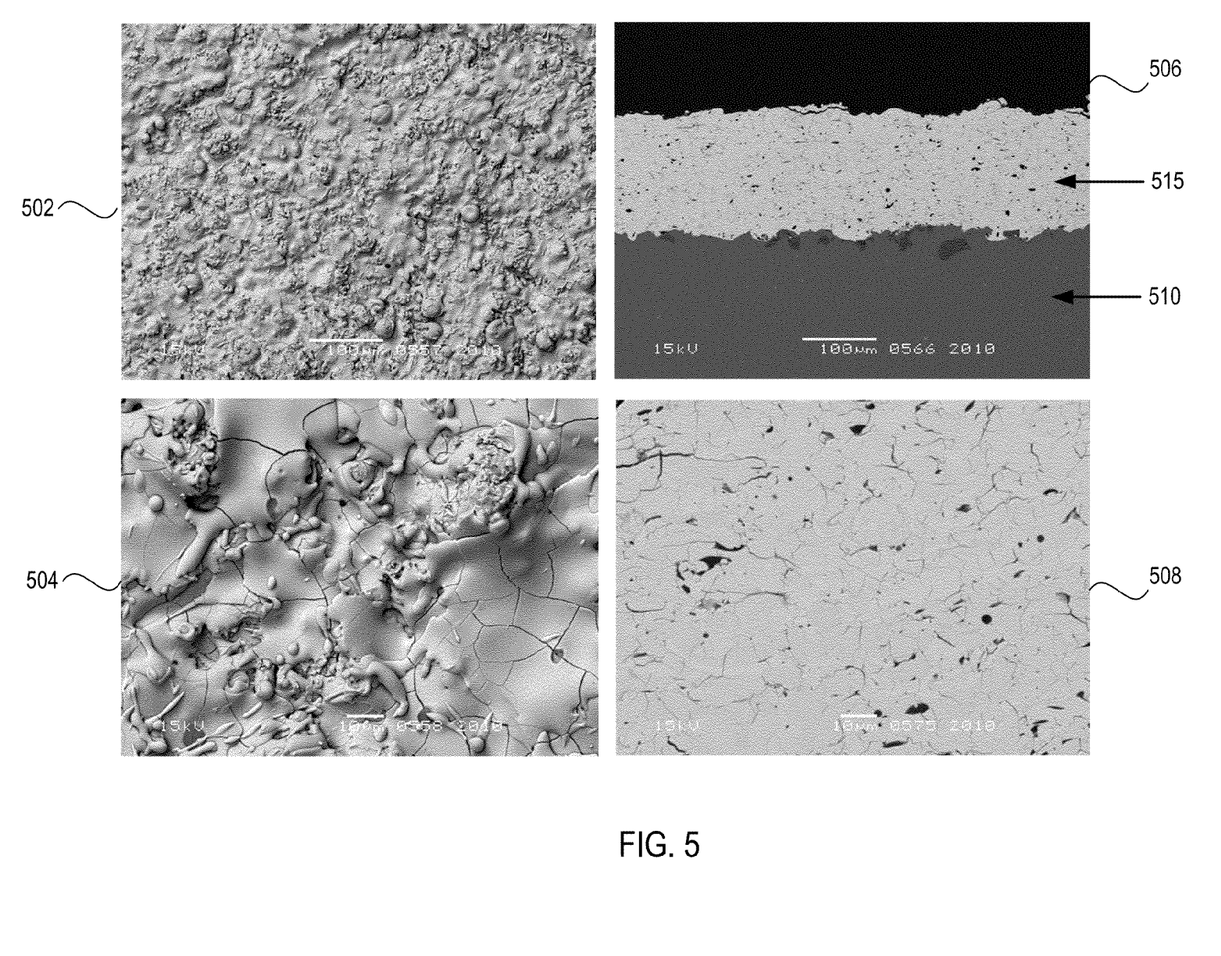
FIG. 5 shows various micrographs of a sample of a ceramic article, in accordance with embodiments of the present invention.

FIG. 5 shows various micrographs 502-508 of a sample of a ceramic article, in accordance with embodiments of the present invention. Micrograph 502 illustrates a ceramic coating's surface at a 4,000-fold magnification. Micrograph 504 shows a sample of the ceramic coating's surface at a 20,000-fold magnification.

Micrograph 506 illustrates a cross-sectional side view of the ceramic article at a 4,000-fold magnification. As shown, the ceramic article includes a ceramic body 510 and a ceramic coating 515 bonded to the ceramic body 510. Micrograph 508 illustrates a sample of the ceramic coating at a 20,000 fold magnification.

Figure 6:
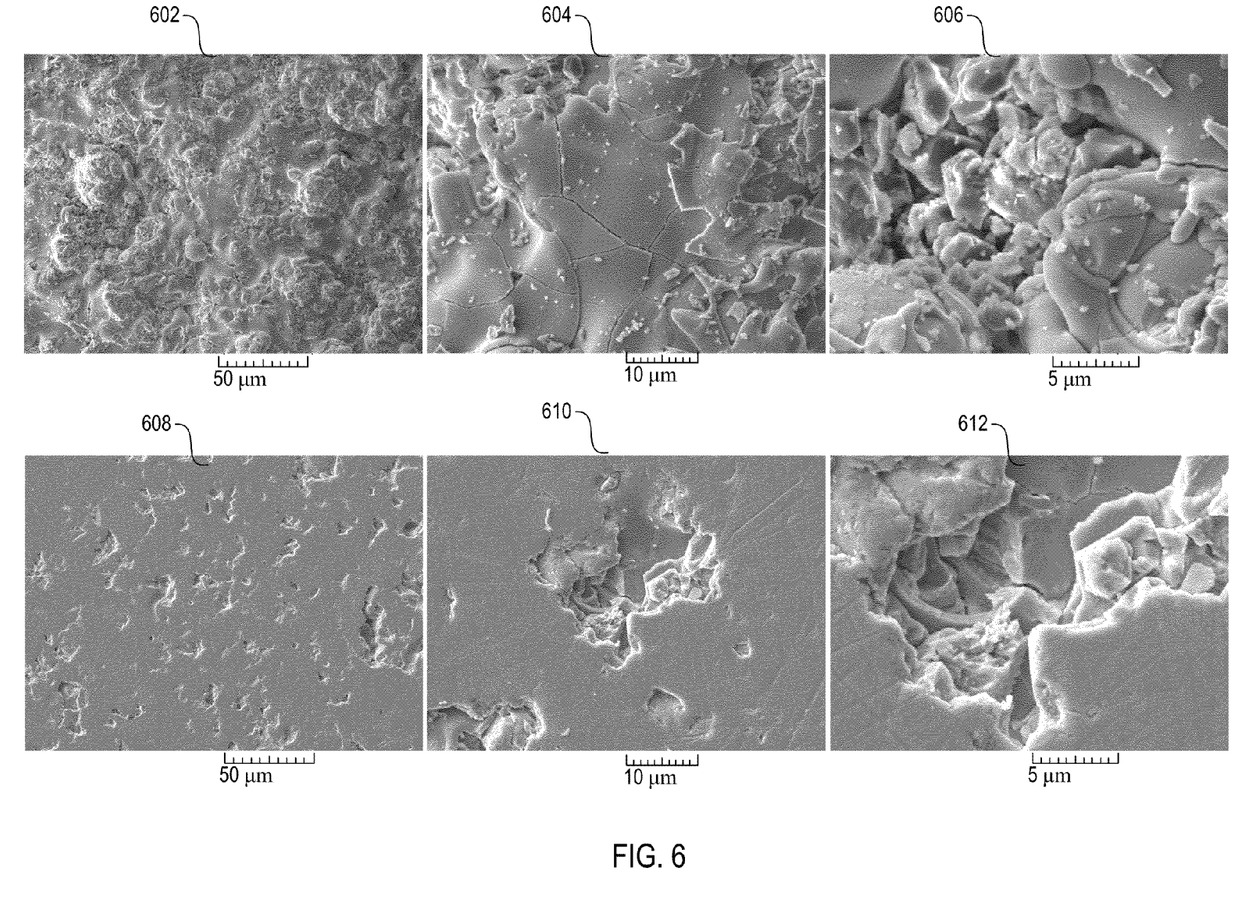
FIG. 6 shows additional micrographs of a ceramic coating's surface at various magnification levels before the ceramic coating is polished, and after the ceramic coating has been polished, in accordance with embodiments of the present invention.

FIG. 6 shows additional micrographs 602-612 of a ceramic coating's surface at various magnification levels before the ceramic coating is polished, and after the ceramic coating has been polished, in accordance with embodiments of the present invention. Micrograph 602 illustrates a ceramic coating at a 1,000-fold magnification before the ceramic coating has been polished. Micrograph 604 illustrates a ceramic coating at a 4,000-fold magnification before the ceramic coating has been polished. Micrograph 606 illustrates a ceramic coating at a 10,000-fold magnification before the ceramic coating has been polished.

Micrograph 608 illustrates a ceramic coating at a 1,000-fold magnification after the ceramic coating has been polished. Micrograph 610 illustrates a ceramic coating at a 4,000-fold magnification after the ceramic coating has been polished. Micrograph 612 illustrates a ceramic coating at a 10,000-fold magnification after the ceramic coating has been polished.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A ceramic article comprising a ceramic body and a ceramic coating, the ceramic article having been prepared by a process comprising:
    applying a first mask to a first region of the ceramic body, wherein the first region is along an outer edge of the ceramic body and the ceramic body comprises $Al_2O_3$;
    roughening the ceramic body to a roughness of approximately 140 micro-inches (μin) to approximately 240 μin, wherein the first region of the ceramic body covered by the first mask is not roughened;
    cleaning the ceramic body;
    applying a second mask to the first region of the ceramic body;
    coating the ceramic body with the ceramic coating using a mixture comprising a first ceramic powder of $Y_2O_3$, a second ceramic powder of $ZrO_2$ and a third ceramic powder of $Al_2O_3$, wherein the ceramic coating is formed from the first ceramic powder of $Y_2O_3$, the second ceramic powder of $ZrO_2$ and the third ceramic powder of $Al_2O_3$, and wherein the first region of the ceramic body is an uncoated region after the coating; and
    polishing the ceramic coating, wherein the ceramic body comprises a hole, and wherein walls of the hole are not coated by the ceramic coating.

2. The ceramic article of claim 1, wherein the ceramic coating comprises a compound of $Y_4Al_2O_9$ (YAM) and a solid solution of $Y_2\text{-}xZr_xO_3$.

3. The ceramic article of claim 1, wherein the ceramic coating has a final thickness of approximately 8-10 mil after performing the polishing.

4. The ceramic article of claim 1, wherein coating the ceramic body comprises:
heating the ceramic body to a temperature of approximately 50° C. to 70° C.; and
plasma spraying the ceramic body using a plasma spray power of approximately 35 W to 36.5 W while the ceramic body is heated.

5. The ceramic article of claim 1, wherein the coating causes a rough edge to form at an interface between the uncoated region and a coated region of the ceramic body, the process further comprising:
trimming the coating at the interface to remove the rough edge.

6. The ceramic article of claim 1, wherein the ceramic coating comprises 55-77 mol % $Y_2O_3$, 15-23 mol % $Z_2O_3$ and 8-25 mol % $Al_2O_3$.

7. The ceramic article of claim 1, wherein the ceramic coating is polished to a roughness of approximately 6-12 μin.

8. A ceramic lid for a plasma etch reactor, comprising:
a ceramic body comprising $Al_2O_3$, a first region of a side of the ceramic body having a roughened surface with a roughness of approximately 140 micro-inches (μin) to approximately 240 μin and a second region of the side having an unroughened surface, wherein the second region is along an outer edge of the ceramic body; and
a ceramic coating on the first region of the ceramic body, wherein the ceramic coating comprises a compound of $Y_4Al_2O_9$ and a solid-solution of $Y_2O_3$—$ZrO_2$ and has a thickness of approximately 8-10 mil, wherein the second region of the ceramic body lacks the ceramic coating;
wherein the ceramic body comprises a hole, and wherein walls of the hole are not coated by the ceramic coating.

9. The ceramic lid of claim 8, further comprising:
an interface between the first region and the second region, wherein the ceramic coating is chamfered or rounded at the interface but the ceramic body is unchamfered and unrounded at the interface.

10. The ceramic lid of claim 8, wherein a roughness of the ceramic coating is approximately 6-12 μin.

11. The ceramic lid of claim 8, wherein the ceramic coating comprises 55-77 mol % $Y_2O_3$, 15-23 mol % $Z_2O_3$ and 8-25 mol % $Al_2O_3$.

12. The ceramic lid of claim 8, wherein the second region is coplanar with the first region and forms a ring around the first region.

* * * * *